United States Patent [19]

Bassett

[11] 4,139,514

[45] Feb. 13, 1979

[54] AQUEOUS VEHICLES

[75] Inventor: David R. Bassett, Charleston, W. Va.

[73] Assignee: Union Carbide Corporation, New York, N.Y.

[21] Appl. No.: 811,037

[22] Filed: Jun. 29, 1977

[51] Int. Cl.$^2$ .............................................. C08L 31/00
[52] U.S. Cl. ....................... 260/29.6 H; 260/29.6 TA;
260/29.6 N; 260/29.6 MQ; 260/42.21; 428/500;
428/461; 428/463
[58] Field of Search .................. 260/29.6 TA, 29.6 H,
260/29.6 N, 29.6 MQ; 428/500

[56] References Cited

U.S. PATENT DOCUMENTS

| | | | |
|---|---|---|---|
| 3,300,431 | 1/1967 | Ueno et al. ...................... | 260/29.6 N |
| 3,404,114 | 10/1968 | Snyder et al. ................... | 260/29.6 N |
| 3,635,867 | 1/1972 | Yuille ............................... | 260/29.6 N |
| 3,845,066 | 10/1974 | Vasta ............................. | 260/29.6 WB |
| 3,894,980 | 7/1975 | De Tommaso ............. | 260/29.6 RW |
| 3,919,154 | 11/1975 | Chang et al. ................. | 260/29.4 UA |
| 4,005,052 | 1/1977 | Sekmakas ....................... | 260/29.6 N |
| 4,045,399 | 8/1977 | Suzuki et al. ................. | 260/29.6 TA |

FOREIGN PATENT DOCUMENTS 251994 11/1960 Australia.
264988 8/1963 Australia.

*Primary Examiner*—Melvyn I. Marquis
*Attorney, Agent, or Firm*—Francis M. Fazio

[57] ABSTRACT

Aqueous, translucent to clear, water-borne vehicles of emulsion polymerized mixture of acrylic acid or methacrylic acid, an acrylate ester and, optionally, a styrene compound. Blends thereof with latexes and clear and pigmented compositions thereof.

23 Claims, No Drawings

AQUEOUS VEHICLES

BACKGROUND OF THE INVENTION

Environmental, health, and safety concerns have prompted changes in the coating and ink industries from solvent based systems to water based systems. In addition, the high costs of solvents and the desires to minimize the quantity of petroleum based organic solvents in such systems have encouraged attempts to discover and develop new ink and coating systems based solely on water as the carrier or solvent. The production of water based systems has also been encouraged by the increasing government restrictions imposed on the user on the amounts and types of organic volatiles permitted to escape into the atmosphere.

Known are three general types of polymers used in water-borne systems, soluble, semi-soluble and latex. The soluble polymers are characterized by clear solutions, whose viscosity depends on the molecular weight of the resins. They are generally made in solution and diluted with water to achieve the desired viscosity for proper application. Thus, they generally have a higher solvent or water content than do the latex compositions. The latexes, in contrast, are opaque suspensions of polymer particles, generally less than one micron in size. The viscosity of a latex is dependent on particle packing rather than one molecular weight and, as a consequence, a combination of high molecular weight and low viscosity at relatively high solids can readily be obtained. The semi-solubles, also called colloidal dispersions, are translucent in appearance and are generally characterized by properties intermediate of those possessed by the solubles and the latexes.

Water-soluble vehicles are of interest and often preferred in place of latex composition because they generally exhibit better flow properties, better pigment binding, and higher gloss of the cured coating.

SUMMARY OF THE INVENTION

It has now been found that certain translucent to clear, readily flowing, water-borne vehicles can be produced by the emulsion polymerization of a mixture of selected monomers, followed by neutralization of the reaction product with a base. The mixture of monomers contains acrylic acid, methacrylic acid or mixtures thereof, acrylate or methacrylate esters or mixtures thereof, and polymerizable ethylenically unsaturated monomers, as hereinafter defined. The water-borne vehicles are useful as coatings or inks; they are applied in conventional manner and then thermally cured to dry.

DESCRIPTION OF THE INVENTION

The water-borne vehicles or compositions that are produced in this invention are the aqueous solutions that are essentially organic-solvent free solutions of the polymers of (1) acrylic acid, methacrylic acid or mixtures thereof; (2) acrylate or methacrylate esters; and (3) optionally a limited group of polymerizable ethylenically unsaturated monomers having a terminal vinyl group. The polymers are produced as latexes by emulsion polymerization processes using known catalysts and chain transfer agents. The latexes formed are then neutralized with a base to solubilize the polymer and yield the translucent to clear, readily flowing, water-borne vehicles.

The acrylic acid and methacrylic acid are present at a concentration of from about 5 to about 30 weight percent of the total weight of monomers charged, preferably from 10 to 15 weight percent thereof.

The acrylate and methacrylate esters are well known to those skilled in the art and are of the general formula:

$$CH_2=CXCOOR$$

wherein X is hydrogen or methyl and R is an unsubstituted or substituted (i) alkyl group having from 1 to about 6 carbon atoms, preferably from 1 to 4 carbon atoms, (ii) phenyl, (iii) naphthyl or (iv) cycloalkyl group having from 5 to 10 ring carbon atoms. Illustrative of such compounds one can mention methyl acrylate, ethyl acrylate, the propyl acrylates, the butyl pentyl and hexyl acrylates, phenyl acrylate, naphthyl acrylate, cyclopentyl acrylate, cyclohexyl acrylate, dicyclopentenyl acrylate, 2-tolyloxyethyl acrylate, benzyl acrylate, neopentyl acrylate, 3-methyl-1-butyl acrylate, 2-ethoxyethyl acrylate, butoxyethoxyethyl acrylate, butoxyethoxyethoxyethyl acrylate, 2-methoxyethyl acrylate, norbornenyl acrylate, dichloroisopropyl acrylate, as well as the corresponding methacrylates of the above. The acrylate and methacrylate esters are well known to those skilled in the art and any of said esters can be used. The preferred are the alkyl acrylate and alkyl methacrylate esters. The concentration thereof in the monomers mixture charged varies from about 30 to 90 weight percent, preferably from about 40 to 70 weight percent.

It was found that only certain polymerizable ethylenically unsaturated monomers can optionally be employed in the production of the desired vehicles. These monomers are those having a terminal vinyl group and are, namely, acrylonitrile, methacrylonitrile acrylamide or methacrylamide and their N-substituted derivatives (e.g. N-methyl acrylamide) and the substituted and unsubstituted styrenes. Illustrative of suitable styrenes one can mention styrene, the o-, m- and p- alkyl styrenes wherein the alkyl group has from 1 to about 4 carbon atoms (such as o-methylstyrene, m-ethylstyrene, p-methylstyrene, p-tert.-butylstyrene), the 2,4-, 2,5- and 3,4-dimethylstyrene, 4-methoxystyrene, 4-phenylstyrene, 4-phenoxystyrene, 2,5-difluorostyrene, 4-chlorostyrene, the 2,5-, 3,4- and 2,6-dichlorostyrenes, 4-benzylstyrene, 2,6-dimethoxystyrene, 3-methoxy-4-hydroxystyrene, 2,5-diethylstyrene, 4-methoxy-3-methylstyrene, 3,4-dimethyl-alpha-methylstyrene, 4-cyanostyrene, 3-hydroxystyrene, 3-nitrostyrene, 2-aminostyrene, 4-N,N-dimethylaminostyrene, as well as any of the other styrene compounds known that do not have a deleterious effect on the polymerization reaction. The polymerizable ethylenically unsaturated monomer is present in the monomers mixture charged at a concentration of from 0 to about 40 weight percent thereof, preferably from 5 to 25 weight percent. The acrylamides are preferably employed at concentrations of from 5 to about 15 weight percent.

A chain transfer agent can be present during the polymerization reaction at a concentration of from about 0 to about 5 weight percent, preferably from 0.1 to 1 weight percent. The preferred chain transfer agents are those that are relatively water-soluble since they are more effective in the aqueous polymerization system than are those that are water-insoluble. Illustrative thereof are the known alkyl and aryl mercaptans such as the essentially water soluble butyl mercaptan, mercaptoacetic acid, mercaptoethanol, 3-mercapto-1,2-propanediol and 2-methyl-2-propanethiol. Many water insoluble mercaptans can also be used, such as t-dodecyl mercaptan, phenyl mercaptan, pentaerythritol tetramercaptopropionate, octyldecyl mercaptan, tetradecyl mercaptan.

In carrying out the emulsion polymerization an initiator or catalyst is used at a concentration sufficient to catalyze the polymerization reaction. This will vary from 0.01 to 3 weight percent based on the weight of monomers charged; it is preferably from 0.05 to 2 weight percent and most preferably from 0.1 to 1 weight percent. The particular concentration used in any instance will depend upon the specific monomers mixture undergoing reaction and the specific initiator employed; these facts are known to those skilled in the art. It is also known that traces of metal ions can be added as activators to improve the rate of polymerization, if desired. Illustrative of suitable initiators one can mention hydrogen peroxide, peracetic acid, t-butyl hydroperoxide, di-t-butyl hydroperoxide, dibenzoyl peroxide, benzoyl hydroperoxide, 2,4-dichlorobenzoyl peroxide, 2,5-dimethyl-2,5-bis(hydroperoxy) hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dieicosyl peroxydicarbonate, di-t-butyl perbenzoate, 2,2'-azobis-2,4-dimethylvaleronitrile, ammonium persulfate, potassium persulfate, sodium persulfate, sodium perphosphate, azobisisobutyronitrile, as well as any of the other known initiators. Also useful are the redox catalyst systems such as sodium persulfate-sodium formaldehyde sulfoxylate, cumene hydroperoxide-sodium metabisulfite, hydrogen peroxide-ascorbic acid, and the other known redox systems.

The polymerizable feed compositions can also contain any of the other known additives conventionally used in emulsion polymerization processes in the usual known quantities, such as crosslinkers, dispersion aids, emulsifiers, photosensitizers, colorants, bacteriacides, fungicides, etc.

Upon the completion of the polymerization there is obtained a water insoluble latex emulsion of the polymer. The polymers are solubilized by neutralization with a base in a manner designed to avoid pH shock. Suitable bases are ammonia, the alkali metal hydroxides and organic amines such as dimethylethanolamine, triethylamine, 2-amino-2-methyl-1-propanol, ethanolamine, triethanolamine and morpholine. Sufficient base is added to neutralize the polymer mixture to a pH of about 8 to 10. The base is preferably added as a dilute solution to minimize the danger of pH shock.

The water-borne vehicles of this invention are useful as coatings or inks. They have also shown advantages in admixture with other latexes to improve the overall general properties of each component. A particular unexpected and unobvious improvement was noted in the use of the water-borne vehicles in roll coating applications; it was found that the open-time was lengthened and the coatings did not cake-up or dry out on the roll coaters.

In a typical reaction, the mixture of acrylic or methacrylic acids, acrylate or methacrylate esters and polymerizable ethylenically unsaturated monomers is emulsion polymerized in the presence of a chain transfer agent and initiator. Typically the polymerization is carried out using a surfactant or emulsifying agent and in aqueous medium the temperature can vary from about 35° C. to about 90° C. or higher; the preferred temperature is from about 70 to about 80° C. The pressure is not critical and is dependent on the nature of the monomers being employed, gaseous monomers requiring superatmospheric pressures. In this manner of typical operation, the mixture of monomers is pre-prepared and the mixture is then added to the reactor in the normal manner.

In a second typical embodiment, one can follow the procedures of monomers addition set forth in U.S. Pat. No. 3,804,881, issued Apr. 16, 1974 to D. R. Bassett and K. L. Hoy. In that process a primary polymerizable feed composition is introduced to the polymerization zone while there is simultaneously introduced to the primary feed composition a different secondary polymerizable feed composition. The procedures are fully described in U.S. Pat. No. 3,804,881 so as to enable the average skilled person in the art to carry out the process without undue experimentation.

Generally, advantages noted have been the absence of co-solvents in the polymerization reaction, the ease by which the molecular weight can be controlled by controlling the amount of chain transfer agent used and the time and manner in which it is added, the ability to produce latexes of higher solids content and therefor the ability to obtain a high solids content water-soluble vehicle at higher conversion rates than were heretofore generally attainable.

In formulating the water-borne vehicles to produce inks or coatings one can incorporate into the vehicle, either before or after neutralization, any of the conventional materials used in the preparation of inks and coatings. For example plasticizers, if desired, stabilizers, flow control agents, antioxidants, pigments, colorants, or any other known additive.

The water-based compositions are applied to a substrate in conventional manner and then dried and cured at temperatures of from 60° C. to 200° C. The cured compositions have general over-all good physical properties.

The water-based latex vehicles of this invention can be produced at high solids contents of up to about 50 weight percent, and this can be as high as about 60 weight percent in certain instances. Neutralization can be carried in either of two ways. In the preferred manner the latex is neutralized with the base while it is still at an elevated temperature at the completion of the polymerizatiion reaction. The latex can also be neutralized during formulation at any desired temperature. Use of the preferred neutralization procedure generally yields a water-soluble vehicle of higher solids content. The solids content of the water-based vehicle or composition after neutralization can be from 20 to 40 weight percent, preferably from 25 to 35 weight percent with this value depending to a large extent on the molecular weight of the polymer produced prior to neutralization and dilution if dilution is required.

The high carboxyl content of the latex permits the production of the essentially water-soluble vehicles on neutralization and dilution and also significantly increases the water retention ability of the resultant coatings thereby permitting good film transfer on a roll coater. It has also been found that the water-soluble compositions described in this invention can be added to other latex compositions to improve the properties of these other known latexes. Thus the addition of a modifying amount of from about 0.5 to 10 weight percent of the vehicle to known acrylic latexes used in coatings compositions modifies the compositions and improved the application properties of the coating. As a modifier, amounts as low as 1 to 2 weight percent were found effective in increasing the open time of the acrylic composition on a roll coater. The addition of quantities of 10 to about 30 weight percent of the water soluble vehicle to acrylic latexes improved the pigment dispersibility and viscosity stability of formulated coatings produced. Such blends usually showed general overall improvements in properties, also noted were improved flow and levelling characteristics of the known acrylic latex blends formulated with the water-soluble vehicles when such blends were applied by reverse roll coater equipment.

The following definitions apply to the tests employed and values reported in the examples:

Resin grade defines the viscosity, in centistokes, of 2 grams of the polymer in 98 grams of solvent; unless otherwise indicated the solvent used was a solution of 5.1 percent water and 94.9 percent of methyl ethyl ketone. The resin grade value serves as an index of molecular weight changes from polymer to polymer with higher resin grade values denoting higher molecular weights.

Viscosity of the latex is Brookfield viscosity determined at 25° C. employing a No. 1 to 4 spindle rotating at 6 rpm. and 60 rpm.

Gloss is measured by a Gardner Glossmeter at 60° and 20°; ASTM-D-523-67.

Pencil hardness is measured using a standard set of Garner pencils of varying hardness; ASTM-D-3363-74.

Flexibility was determined by bending the coated steel panel around a ⅛ inch mandrel and measuring the distance in mm. from the edge of the bent panel to the point at which no cracking could be detected; ASTM-D-522-60.

Acetone resistance is a measure of the resistance of the cured film to attack by acetone and is reported in the number of double rubs or cycles of acetone soaked material required to remove one half of a film from the test area. The test is performed by stroking the film with an acetone soaked cheesecloth until that amount of film coating is removed. The number of cycles required to remove this amount of coating is a measure of the coating solvent resistance.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coated metal panel. The inches times pounds, designated inch-pound, absorbed by the film without rupturing is a measure of the films reverse-impact resistance.

Open time is a measure of the time before the paint becomes sticky or immobile during use on a roll coater. It is determined using a paint having a viscosity of about 500 cps., measured with a Brookfield RVT viscometer. A wet 3 mil film of the paint is cast on a glass plate resting on a balance. Immediately a stop watch is started and simultaneously the experimentor begins to rub the paint film in a circular motion covering an area of about one square inch at a relatively uniform pressure of 200 to 250 grams. When the film becomes sticky or immobile the open time is recorded; high value are preferred.

T-Bend is a measure of film flexibility by stretching. The coated substrate is bent back on itself in concentric loops until a 180° bend shows no cracking. Substrate thickness (T) separating the two outer sections at this point is an index of the film flexibility.

The following examples serve to further illustrate this invention. Parts are by weight unless otherwise indicated.

EXAMPLE 1

A reaction vessel immersed in a thermostatted water bath and fitted with a stirrer, thermometer, nitrogen inlet tube, monomers addition inlet and reflux condenser was charged with 800 parts of boiled distilled water. After the contents had been heated to 74° C., 1.5 parts of dioctyl sodium sulfosuccinate as surfactant and 3.5 parts of ammonium persulfate were added. A mixture of monomers was then added at a rate of 5 parts per minute with constant stirring. The mixture contained 180 parts of styrene, 270 parts of ethyl acrylate, 75 parts of 2-hydroxyethyl acrylate, 75 parts of methacrylic acid, 6 parts of n-butyl mercaptan and 3 parts of dioctyl sodium sulfosuccinate. The addition was carried out at 75 to 80° C. and after the end of the monomers addition, the latex reaction product was stirred for an additional hour at 80°C. then cooled and removed from the reactor. The latex had a resin grade of 0.663, a total solids content of 41.58 weight percent, a pH of 2.5 and a viscosity of 20 cps.

A 480 gram portion of the latex was solubilized at room temperature by the addition of a 50 percent aqueous solution of dimethylethanolamine to a pH between 8 and 9.

A paint was formulated using 239 parts of the above solubilized latex and diluted with 317 parts of distilled water. About 250 parts of the diluted mixture was placed in a mixer, 100 parts of titanium dioxide were slowly added and stirred at medium speed for 10 minutes. The remainder of the diluted mixture containing 38 phr of hexamethoxymethylmelamine was then slowly added to the agitating pigmented mixture. The formulation was rolled overnight in a ball mill, filtered and 420 parts of water were added in small increments to adjust the Brookfield viscosity of the formulation per se to 185 cps; the formulation had an application solids content of 31.9 weight percent.

The paint was spray applied to a steel panel using a conventional spray gun. The panel was air dried for 20 minutes at room temperature and then at 177° C. for 20 minutes to yield a 1.1 mils thick dry film having a 60/20 gloss of 98/93, pencil hardness of 7H, reverse impact of less than 5 inch-pounds, flexibility of 77 mm. using a ⅛ inch mandrel and acetone resistance of 100 rubs.

A series of latex emulsions was produced following the general procedure described in Example 1. Table I sets forth the concentrations of reactants added to the solution of water, surfactant and initiator in the reactor and the properties of the insoluble latex emulsion produced. Table II indicates that the insoluble latex emulsion was solubilized and these were used to produce paint compositions similar to those described in Example 1 as well as the properties of the paint compositions prior to and after cure. Solubilization was achieved by the addition of a 50 weight percent aqueous solution of dimethylethanolamine to a pH of between 8 and 9. In all instances titanium dioxide was used as the pigment and the acetone resistance values were 100. In Examples 22 and 23, solubilization and neutralized was carried out at 80° C. using ammonia as the base.

The primary feed tank had an initial content of 60 parts of styrene, 190 parts of ethyl acrylate, 25 parts of

TABLE I
LATEX EMULSIONS

| Ex. | MMA | STY | EA | HEA | MAA | AA | % Mercap. | | Grade | T, % | pH | Viscosity 6/60 |
|---|---|---|---|---|---|---|---|---|---|---|---|---|
| 2  | 30 |    | 45     | 12.5 | 12.5 |      | 1    | B | 0.657 | 42.64 | 2.8 | 22/23 |
| 3  | 35 |    | 55     |      |      | 10   | 1    | B |       | 43.12 | 2.8 | 20/22 |
| 4  | 30 |    | 45     | 12.5 | 12.5 |      | 1    | P | 0.894 | 42.50 | 3.2 | 21/26 |
| 5  |    | 27 | 58(BA) |      | 15   |      | 1    | B | 0.660 | 44.5  | 5.2 | 18/18 |
| 6  | 30 |    | 45     | 12.5 | 12.5 |      | 2    | P | 0.747 | 49.1  | 5.5 | 68/68 |
| 7  | 50 |    | 44(BA) |      | 6    |      | 1    | B | 0.643 | 45.2  | 6.2 | 12/13 |
| 8  | 30 |    | 45     | 12.5 | 12.5 |      | 2    | B | 0.610 | 54.47 | 5.8 | 90/70 |
| 9  | 30 |    | 45     | 12.5 |      | 12.5 | 1    | B |       | 42.50 | 2.9 | 25/23 |
| 10 |    | 30 | 45     | 12.5 | 12.5 |      | 2    | B | 0.623 | 50.99 | 6.0 | 1800/700 |
| 11 | 30 |    | 45(BA) | 12.5 | 12.5 |      | 1    | B |       | 44.75 | 5.6 | 32/36 |
| 12 |    | 30 | 45(BA) | 12.5 | 12.5 |      | 1    | B |       | 44.20 | 5.0 | 1550/460 |
| 13 | 35 |    | 52.5   |      |      | 12.5 | 1    | B | 0.659 | 45.33 | 4.9 | 22/27 |
| 14 |    | 30 | 45     | 12.5 | 12.5 |      | 1    | B |       | 46.89 | 5.6 | 625/405 |
| 15 |    | 25 | 62.5   |      |      | 12.5 | 1    | B | 0.663 | 43.26 | 4.4 | 55/56 |
| 16 |    | 25 | 50     | 12.5 | 12.5 |      | 1    | B | 0.656 | 43.74 | 4.4 | 2800/1040 |
| 17 |    | 20 | 55     | 12.5 | 12.5 |      | 1    | B |       | 43.86 | 6.0 | 250/260 |
| 18 |    | 20 | 67.5   |      | 12.5 |      | 1    | B |       | 44.2  | 6.4 | 14/19 |
| 19 | 20 |    | 67.5   |      | 12.5 |      | 1    | B | 0.655 | 44.08 | 6.6 | 13/16 |
| 20 | 20 |    | 67.5   |      | 12.5 |      | 4    | B | 0.582 | 53.42 | 6.2 | 30/23 |
| 21 |    | 20 | 67.5   |      | 12.5 |      | 5    | B | 0.582 | 59.94 | 6.0 | 250/140 |
| 22 | 5  | 40 | 45     |      | 10   |      | 0.25 | B |       | 28.5  | 9.6 | 540 |
| 23 | 25 | 25 | 40     |      | 10   |      | 0.25 | B |       | 25.6  | 8.9 | 225 |

MMA = Methylmethacrylate
STY = Styrene
EA = Ethyl acrylate
B = Butyl Mercaptan
BA = Butyl Acrylate
HEA = 2-Hydroxyethyl acrylate
MAA = Methacrylic acid
AA = Acrylic acid
P = PETMP

TABLE II
PAINT COMPOSITIONS

| | Paint Properties | | | Film Properties | | | | |
|---|---|---|---|---|---|---|---|---|
| Ex. | HM PHR | Visc. cps | Application Solids, % | Thickness, mils | Gloss 60/20 | Pencil Hardness | Reverse Impact, in./lbs. | Flex. ⅛" Man. |
| 2  | 37   | 50  | 32   |     | 79 | 60 | 6H | <5  |       |
| 3  | 22   | 50  | 39   |     | 88 | 69 | 7H | <5  |       |
| 4  | 38   | 130 | 27.8 | 0.9 | 90 | 67 | 8H | <5  | 77 mm |
| 5  | 25.3 | 152 | 38.7 | 1.0 | 88 | 66 | 3H | <5  | 0 mm |
| 6  | 38   | 135 | 45.0 | 1.2 | 74 | 42 | 7H | 5   | 77 mm |
| 7  | 10.1 | 85  | 45.9 | 0.9 | 75 | 55 | 4H | <5  | 0 mm |
| 8  | 25.0 | 180 | 40.9 | 1.0 | 6  | 4  | 7H | <5  | 20 mm |
| 9  | 25.0 | 155 | 39.4 | 0.9 | 86 | 52 | 7H | <5  | 32 mm |
| 10 | 25.0 | 126 | 50.2 | 1.4 | 40 | 14 | 5H | <5  | 27 mm |
| 11 | 25.0 | 100 | 39.6 | 1.2 | 69 | 36 | 5H | <5  | 32 mm |
| 12 | 25.0 | 180 | 39.4 | 0.9 | 93 | 69 | 4H | <5  | 20 mm |
| 13 | 25.0 | 185 | 37.9 | 1.0 | 87 | 68 | 4H | 25  | 10 mm |
| 14 | 12.5 | 105 | 46.6 | 1.4 | 86 | 62 | 7H | <5  | 24 mm |
| 15 | 25.0 | 185 | 41.2 | 1.1 | 93 | 77 | 2H | 75  | 0 mm |
| 16 | 25.0 | 185 | 31.4 | 1.0 | 89 | 65 | 7H | <5  | 40 mm |
| 17 | 25.0 | 195 | 41.9 | 0.8 | 89 | 70 | 7H | <5  | 42 mm |
| 18 | 12.5 | 105 | 54.4 | 1.5 | 66 | 20 | 2H | 75  | 0 mm |
| 19 | 25.0 | 135 | 41.7 | 1.0 | 90 | 77 | 2H | 25  | 0 mm |
| 20 | 25.0 | 170 | 49.1 | 1.2 | 85 | 56 | HB | 50  | 0 mm |
| 21 | 25.0 | 160 | 42.6 | 1.2 | 95 | 90 | F  | 150 | 0 mm |

HM = Hexamethoxymethylmelamine

EXAMPLES 24-25

In this series of examples the procedure followed was that described in U.S. Pat. No. 3,804,881. The polymerization reaction system consisted of the polymerization reactor, equipped as described in Example 1. Connected directly to the polymer to the polymerization reactor through the monomers addition inlet was the primary feed tank which was equipped with a stirrer and connected to the inlet of the primary feed tank was the secondary feed tank.

The polymerization reactor was initially charged with 800 grams of distilled water, 1.5 parts of dioctyl sodium sulfosuccinate and 3 parts of ammonium persulfate and the mixture was heated to 80° C.

2-hydroxyethyl acrylate, 25 parts of methacrylic acid, 3 parts of butyl mercaptan and 4 parts of dioctyl sodium succinate.

The secondary feed tank had an initial content of 120 parts of styrene, 80 parts of ethyl acrylate, 50 parts of 2-hydroxyethyl acrylate, 50 parts of methacrylic acid, 3 parts of butyl mercaptan and 2 parts of dioctyl sodium succinate.

The contents of the primary feed tank were pumped into the reactor at a rate of 4 parts per minute. Simultaneously the contents of the secondary feed tank were pumped into the primary feed tank at a rate of 2 parts per minute and thoroughly mixed therein. The pumping sequence caused a continual change in the compositional The procedure used in Examples 24 and 25 produces a clearer vehicle of slightly higher solids, a broader molecular weight distribution, and the latex polymer is more easily solubilized during neutralization.

TABLE III

| Example | 24 | 25 |
|---|---|---|
| Insol. Latex Emulsion | | |
| Total Solids, % | 40.6 | 40.8 |
| pH | 5.8 | 5.9 |
| Viscosity, 6/60 | 1900/440 | 150/135 |
| Neutralization at Room Temperature | | |
| Insol. Latex Emulsion, pts. | 246.3 | 245.1 |
| Dimethylethanolamine, pts. | 5 | 6.75 |
| Water, pts. | 185 | 130.5 |
| pH | 8.2 | 8.4 |
| Paint Formulation | | |
| Titanium Dioxide, pts. | 100 | 100 |
| Hexamethoxymethyl-melamine, phr. | 25 | 25 |
| Brookfield Viscosity, cps. | 105 | 82 |
| Application Solids, % | 40.4 | 44.9 |
| Coating Properties | | |
| Film Thickness, mil | 1 | 1 |
| Gloss, 60/20 | 96/83 | 95/75 |
| Pencil Hardness | 7H | 7H |
| Reverse Impact, in./lbs. | 5 | 5 |
| Flexibility, mm. | 23 | 40 |
| Acetone Resistance, rubs | 100 | 100 |

EXAMPLE 26

Following the procedure described in Example 14, a composition was produced having a pH of 5.6 and a total solids of 46.9 weight percent.

A pigment paste was produced by grinding the following components, in grams:

| | |
|---|---|
| Ethylene glycol | 120 |
| Nonylphenoxypoly(ethyleneoxy)ethanol | 80 |
| Dispersant (Disperbyke) | 160 |
| Foamaster VL (Defoamer) | 40 |
| Dimethylethanolamine | 8 |
| Water | 1600 |
| Titanium dioxide | 8000 |

A paint was formulated by a procedure similar to that described in Example 1 using the following components, in grams:

| | |
|---|---|
| Water-soluble vehicle, Ex. 26 | 1370 |
| Pigment paste | 740.2 |
| Dimethylethanolamine | 52 |
| Hexamethoxymethylmelamine | 96.4 |
| Water | 950 |
| Foamaster VL (Defoamer) | 1.5 |

The formulated paint had a total solids content of 41.5 percent, pH of 9.2 and Brookfield viscosity of 330 cps. It was applied with a reverse roll coater onto an aluminum strip travelling at a rate of about 100 feet per minute. The open time of the paint on the rollers was excellent, in excess of 20 minutes; some foam generation was noted. After an air dry of one minute, the strip was cured at 250° C. for one minute. While some pin-hole cratering was observed, the paint had excellent flow and leveling properties.

EXAMPLE 27

A blend was produced using the water-soluble vehicle of Example 10 and a 20/27.5/46.5/2/4 latex of styrene/methyl methacrylate/butyl acrylate/acrylic acid/2-hydroxyethyl acrylate. This acrylic latex had a total solids content of 42.5 percent. The formulated paint contained the following components, in grams:

| | |
|---|---|
| Water-soluble vehicle, Ex. 10 | 450 |
| Acrylic latex | 1350 |
| Pigment paste, Ex. 26 | 910.5 |
| Dimethylethanolamine | 10 |
| Butoxyethyl acetate | 32.3 |
| Hexamethoxymethylmelamine | 106.1 |
| Water | 250 |
| Foamaster VL | 1.8 |

The formulated paint had a total solids content of 56 percent, pH of 8.9 and Brookfield viscosity of 960 cps. The paint was applied and cured as described in Example 24. No pin-hole catering was observed; flow and leveling properties were good.

EXAMPLE 28

Following the procedure described in Example 18, a latex was produced having a pH of 6.6 and a total solids content of 47.8 percent.

A clear water-soluble coating composition was formulated using the following components, in grams:

| | |
|---|---|
| Water-soluble vehicle, Ex. 28 | 1389 |
| Dimethylethanolamine | 60 |
| Hexamethoxymethylmelamine | 99.6 |
| Water | 1250 |
| Foamaster VL | 2 |

The clear coating had a total solids content of 27.3 percent, pH of 8.4 and Brookfield viscosity of 160 cps. It was applied with a direct roll coater onto an aluminum strip traveling at a rate of about 100 feet per minute. The open time was excellent; foam was observed. The coated strip was cured at 150° C. for 12 minutes. Flow and leveling were excellent with no pin-hole cratering observed. The cured coating was smooth, glossy, had a pencil hardness value of H and 100 percent adhesion.

The use of the water soluble vehicles of this invention in blends with acrylic latex emulsions is shown in the following examples.

EXAMPLE 29

In a manner similar to that described in Example 1 a latex was produced using 25 parts of styrene, 62.5 parts of ethyl acrylate, 12.5 parts of acrylic acid, 1 part of butyl mercaptan. This latex product (Vehicle I) had a total solids content of 47.5 percent, pH of 4.7 and a 6/60 viscosity of 1800/700.

Pigment Paste A — A pigment paste was prepared by grinding 400 grams of titanium dioxide, 168.4 grams of Vehicle I that had been neutralized with 22.4 grams of dimethylethanolamine to a pH of 9.5 and diluted with 245 ml. of water, and then another 50 grams of water was added to adjust solids content.

Pigment Paste B — A second pigment paste was prepared by grinding 300 grams of titanium dioxide, 63.2 grams of Vehicle I, 69.9 grams of a 45/45/5/5 acrylic latex of styrene/ethyl acrylate/methacrylic acid/2-hydroxyethyl acrylate. Vehicle I had been neutralized to a pH of 10 with 7.5 grams of dimethylethanolamine and diluted with 61 grams of water.

Pigment Paste C — A third pigment paste was prepared by grinding a mixture of 1707 grams of water, 4 grams of dimethylethanolamine, 124 grams of ethylene glycol, 267 grams of dispersant (Tamol 731 ®), 82 grams of nonylphenoxypoly(ethyleneoxy) ethanol, 20 grams of defoamer (Foamaster VF ®) and 7,796 grams of titanium dioxide.

Pigment Pastes A, B and C were used to produce paint compositions. The formulated paints contained the components shown in Table IV. For comparative purpose a control was produced that did not contain any of the water-soluble vehicle of this invention. In producing the paints, Vehicle I was solubilized with dimethylethanolamine as indicated. The formulated paints were spray applied to steel panels and cured at 160° C. for 20 minutes. The blends containing Vehicle I yielded significantly harder films with equal gloss and generally better impact flexibility at higher pigment loadings as compared to the Control. Chemical and stain resistance properties were almost the same. Cratering was noted in all instances.

It was also noted that the water-soluble vehicles of this invention were per se efficient pigment dispersants and did not require the further addition of conventionally employed pigment dispersants.

TABLE IV

| Run Paint Formulation | a | b | c | d | Cont. |
|---|---|---|---|---|---|
| Pigment Paste A,g. | 144.4 | 206.3 | — | — | — |
| Pigment Paste B,g. | — | — | 117 | 167.2 | — |
| Pigment Paste C,g. | — | — | — | — | 243.7 |
| Water,g. | 269 | 270.8 | 91.6 | 53.4 | — |
| Vehicle I,g. | 146 | 146 | — | — | 542 |
| Acrylic Latex,g* | — | — | 167.4 | 152.9 | 45 |
| Hexamethoxymethyl-melamine,g. | 16.7 | 16.7 | 16.7 | 16.7 | 27 |
| Butoxyethyl acetate, g. | 10 | 10 | 10 | 10 | 0.3 |
| Dimethylethanol-amine, g. | 9.5 | 10.4 | 2.8 | 1.6 | — |
| Foamaster VF, g. | — | — | 0.284 | 0.342 | 41.07 |
| Total Solids, % | 25.79 | 28.71 | 37.75 | 45.57 | |
| Coating Properties | | | | | |
| Film Thickness,mil | 1 | 1 | 1 | 1 | 1 |
| Gloss, 60/20 | 89/73 | 89/78 | 92/71 | 92/74 | 94/76 |
| Pencil Hardness | 3H | 3H | 3H | 5H | 2H |
| T-Bend | 6-T | 5-T | 5-T | 6-T | 6-T |
| Impact,Front/Reverse | 150/50 | 150/35 | 130/75 | 160/80 | 110/60 |

*=Same acrylic latex used in producing Pigment Paste B

EXAMPLE 30

A latex was produced having the same composition described in Example 2, using the procedure of Example 1. This latex was used to produce a modified paint composition by the addition of a small amount thereof to a conventional acrylic latex paint. The modified paint composition (Coating A) contained the following components:

| Latex, Ex. 30 | 19.5 | grams |
|---|---|---|
| Conventional latex* | 850 | |
| Dimethylethanolamine | 8 | |
| Butoxyethanol | 43.7 | |
| Hexamethylmethylmelamine | 72.8 | |
| Pigment grind | 448.3 | |
| p-Toluenesulfonic acid | 0.36 | |
| Water | 56 | |

*=a 30/20/45/2.5/2.5 latex of methyl methacrylate/styrene/butyl acrylate/methacrylic acid/2-hydroxyethyl acrylate having a pH of 8.55 and a total solids content of 42 percent Pigment grind contained the following components:

| Ethylene glycol | 120 | grams |
|---|---|---|
| Nonylphenoxypoly(ethyleneoxy)ethanol | 80 | |
| Defoamer (Foamaster VF) | 5 | |
| Dispersant (Tamol 731) | 320 | |
| Dimethylethanolamine (70%) | 10 | |
| Titanium dioxide | 8000 | |

| Water | 1725 |
|---|---|

Coating A had a pH of 9.2 and a total solids content of 52.5. It was applied to primed aluminum strip substrate on a Giordana Lab Model Roll coater at a wet thickness of about 3 mils and cured to a dry film, having a thickness of about 1.6 mils, at 450° F. in 90 seconds. The open time test gave a value of 130 seconds and the film remained fluid and wet on the roll during application.

For comparative purposes a Control composition was produced free of the latex of Example 30. This control contained the following components:

| Conventional latex (same as above) | 600 | grams |
|---|---|---|
| Dimethylethanolamine | 3 | |
| Butoxyethanol | 15.3 | |
| Hexamethoxymethylamine | 34.1 | |
| Pigment grind | 320.1 | |
| Water | 85 | |

The pigment grind contained:

| Ethylene glycol | 120 | grams |
|---|---|---|
| Nonylphenoxypoly(ethyleneoxy)ethanol | 120 | |
| Defoamer (Foamaster VF) | 8 | |
| Dispersant (Tamol 731) | 480 | |
| Dimethylethanolamine | 10 | |
| Water | 1710 | |
| Titanium dioxide | 8000 | |

The Control composition rapidly dried on the rolls of the roll coater, preventing continuous film transfer. It had an open time value of only 80 seconds.

The results show the beneficial effect exerted by the addition of a small amount of the compositions of this invention to a conventional acrylic latex paint composition.

What is claimed is:

1. An aqueous, translucent to clear, water-borne vehicle comprising an aqueous solution consisting essentially of water and from 20 to 40 weight percent of an emulsion polymerized polymer of a monomers mixture, based on weight, of:
   (a) from about 5 to 30 weight percent of acrylic acid, methacrylic acid or mixtures thereof;
   (b) from about 30 to about 90 weight percent of an ester of the formula:

$$CH_2=CXCOOR$$

wherein X is hydrogen or methyl and R is an unsubstituted or substituted (i) alkyl group of from 1 to about 6 carbon atoms, (ii) phenyl group, (iii) naphthyl group of (iv) a cycloalkyl group having from 5 to 10 ring carbon atoms;
   (c) from 0 to about 40 weight percent of polymerizable ethylenically unsaturated monomers of the group acrylonitrile, methacrylonitrile, acrylamide or methacrylamide and the N-substituted derivatives thereof and substituted and unsubstituted styrenes; and
   (d) from 0 to about 5 weight percent of a chain transfer agent;
said polymer solubilized with a base of the group ammonia, organic amines and alkali metal hydroxides and further said vehicle has a pH of from about 8 to about 10.

2. An aqueous vehicle as claimed in claim 1, wherein monomer (a) is present at a concentration of from 10 to 15 weight percent, monomer (b) is present at a concentration of from 40 to 70 weight percent and monomer (c) is present at a concentration of from 5 to 25 weight percent.

3. An aqueous vehicle as claimed in claim 2, wherein monomer (a) is acrylic acid.

4. An aqueous vehicle as claimed in claim 2, wherein monomer (a) is methacrylic acid.

5. An aqueous vehicle as claimed in claim 1, wherein monomer (a) is methacrylic acid, monomer (b) is a mixture of ethyl acrylate and 2-hydroxyethyl acrylate, and monomer (c) is styrene.

6. An aqueous vehicle as claimed in claim 1, wherein monomer (a) is methacrylic acid and monomer (b) is a mixture of ethyl acrylate, 2-hydroxyethyl acrylate and methyl methacrylate.

7. An aqueous vehicle as claimed in claim 1, wherein monomer (a) is acrylic acid and monomer (b) is a mixture of ethyl acrylate and methyl methacrylate.

8. An aqueous vehicle as claimed in claim 1, wherein monomer (a) is methacrylic acid, monomer (b) is butyl acrylate and monomer (c) is styrene.

9. An aqueous vehicle as claimed in claim 1, wherein monomer (a) is methacrylic acid, monomer (b) is a mixture of butyl acrylate and 2-hydroxyethyl acrylate and monomer (c) is styrene.

10. An aqueous vehicle as claimed in claim 1, wherein monomer (a) is acrylic acid, monomer (b) is ethyl acrylate and monomer (c) is styrene.

11. An aqueous vehicle as claimed in claim 1, wherein monomer (a) is acrylic acid, monomer (b) is a mixture of ethyl acrylate and 2-hydroxyethyl acrylate and monomer (c) is styrene.

12. An aqueous vehicle as claimed in claim 1, wherein monomer (a) is methacrylic acid, monomer (b) is ethyl acrylate and monomer (c) is styrene.

13. An aqueous vehicle as claimed in claim 1, wherein monomer (a) is methacrylic acid or acrylic acid, monomer (b) is a mixture of methyl methacrylate and ethyl acrylate and monomer (c) is styrene.

14. An aqueous vehicle as claimed in claim 1, wherein monomer (a) is methacrylic acid or acrylic acid monomer (b) is a mixture of methyl methacrylate, 2-hydroxyethyl acrylate and ethyl acrylate and monomer (c) is styrene.

15. A process for producing a translucent to clear, readily flowing, water-borne aqueous vehicle comprising the steps of:
(A) emulsion polymerizing in water a mixture of monomers wherein (a) from about 5 to about 30 weight percent of said monomers in said mixture is acrylic acid, methacrylic acid or mixtures thereof; (b) from about 30 to about 90 weight percent is an ester of the general formula:

$$CH_2=CXCOOR$$

wherein X is hydrogen or methyl and R is an unsubstituted or substituted (i) alkyl group having from 1 to about 6 carbon atoms, (ii) phenyl group, (iii) naphthyl group or (iv) cycloalkyl group having from 5 to 10 ring carbon atoms; (c) from about 0 to about 40 weight percent of polymerizable ethylenically unsaturated monomers of the group acrylonitrile, methacrylonitrile, acrylamide or methacrylamide and the N-substituted derivatives thereof and substituted and unsubstituted styrenes; in contact with about 0 to 5 weight percent of a chain transfer agent and a catalyst to produce a latex emulsion and then
(B) solubilizing the latex with a base from the group of ammonia, organic amine or alkali metal hydroxide to a pH of from about 8 to about 10.

16. A blend comprising from 0.5 to 10 weight percent of an aqueous vehicle as claimed in claim 1 and from 90 to 99.5 weight percent of a latex, said percentages based on the total weight of said vehicle and said latex.

17. A blend as claimed in claim 16, wherein said vehicle is present at a concentration of from 1 to 2 weight percent.

18. A blend as claimed in claim 16, wherein said latex is an acrylic latex.

19. An aqueous vehicle as claimed in claim 1, wherein a pigment is additionally present.

20. A blend as claimed in claim 16, wherein a pigment is additionally present.

21. A coated substrate comprising a substrate and on the surface thereof a vehicle as claimed in claim 1 in the form of a dry polymer.

22. A coated substrate comprising a substrate and on the surface thereof a vehicle as claimed in claim 19 in the form of a dry polymer.

23. A coated substrate comprising a substrate and on the surface thereof a vehicle as claimed in claim 20 in the form of a dry polymer.

* * * * *